(12) United States Patent
Bursal et al.

(10) Patent No.: US 6,186,922 B1
(45) Date of Patent: Feb. 13, 2001

(54) IN-LINE TRANSMISSION WITH COUNTER-ROTATING OUTPUTS

(75) Inventors: Faruk H. Bursal, Waltham; Frank A. Folino, Salem; James E. Maslow, Lexington, all of MA (US)

(73) Assignee: Synkinetics, Inc., Lowell, MA (US)

( * ) Notice: Under 35 U.S.C. 154(b), the term of this patent shall be extended for 0 days.

(21) Appl. No.: 09/054,088

(22) Filed: Apr. 2, 1998

Related U.S. Application Data

(63) Continuation-in-part of application No. 08/826,475, filed on Mar. 27, 1997, and a continuation-in-part of application No. 08/920,311, filed on Aug. 30, 1997, and a continuation-in-part of application No. 09/016,501, filed on Jan. 30, 1998.

(51) Int. Cl.$^7$ .................................................. F01H 13/06
(52) U.S. Cl. ............................ 476/18; 476/36; 475/248; 475/221; 74/665 F
(58) Field of Search ................... 475/248–252, 475/221, 273–342; 74/665 F, 665 G; 476/18, 36

(56) References Cited

U.S. PATENT DOCUMENTS

| | | |
|---|---|---|
| 900,598 | 10/1908 | Schuermann . |
| 1,568,290 | 1/1926 | Morison .................... 74/25 |
| 2,276,908 | 3/1942 | Schmid ................. 475/104 |
| 2,512,272 | 6/1950 | Gull ......................... 74/63 |
| 2,565,828 | 8/1951 | Vivie . |
| 2,571,172 | 10/1951 | Robin et al. ............. 475/5 |
| 2,841,036 | 7/1958 | Decker .................... 74/650 |
| 3,039,324 | 6/1962 | Waterfield ............ 74/63 X |
| 3,049,019 | 8/1962 | Lapointe et al. ........ 476/36 |
| 3,278,155 | 10/1966 | John . |
| 3,319,925 | 5/1967 | Kojima et al. . |
| 3,424,018 | 1/1969 | Alsch ..................... 476/38 |

(List continued on next page.)

FOREIGN PATENT DOCUMENTS

| | | | |
|---|---|---|---|
| 801421 | 1/1951 | (DE) | ...................................... 74/650 |
| 24020 | 2/1922 | (FR) | . |
| 1021945 | 2/1953 | (FR) | . |
| 2346611 | 10/1977 | (FR) | ...................................... 74/650 |
| 710543 | 6/1952 | (GB) | . |
| 59-133863 | 8/1984 | (JP) | . |
| 59-180153 | 10/1984 | (JP) | . |
| 60-4663 | 1/1985 | (JP) | . |
| 60-129462 | 7/1985 | (JP) | . |
| 60-146954 | 8/1985 | (JP) | . |
| 60-168954 | 9/1985 | (JP) | . |
| 60-179563 | 9/1985 | (JP) | . |
| 890072449 | 3/1989 | (JP) | . |
| 629387 | 5/1978 | (SU) | . |
| 1257-331 | 2/1985 | (SU) | . |
| 1399-548 | 12/1986 | (SU) | . |
| 1399548 | 12/1986 | (SU) | . |
| 1490-362 | 5/1987 | (SU) | . |

(List continued on next page.)

OTHER PUBLICATIONS

"Balls Reduce Speed and Transmit Torque", *Mechanical Engineering & Technology Guide,*; publ. prior to Mar. 14, 1991.

Dojen™ Precision Rotary Actuator Designer's Guide (Dir. of Lenze, Woburn, MA), published prior to Mar. 14, 1991.

"General Information on Sinusoidal Ball Drivers", *Soviet Engineering Research*, vol. 6 (1986) Feb., No. 2 @ pp. 23–26, Mowbray, Leicestershire G.B. (also referenced as *Sov. Engineering Research*, V. Mashinostroeniya, Jun. 1986, Issue 2, pp. 24–28).

*Primary Examiner*—Khoi Q. Ta
(74) *Attorney, Agent, or Firm*—Perkins, Smith & Cohen, LLP; Jacob N. Erlich; Jerry Cohen

(57) ABSTRACT

Method and apparatus for rotary motion converting power transmission assembly with counter-rotating outputs on the same axis as the rotary input.

20 Claims, 12 Drawing Sheets

U.S. PATENT DOCUMENTS

| | | | |
|---|---|---|---|
| 3,468,175 | 9/1969 | Rabek | 74/63 |
| 3,477,693 | 11/1969 | Benzanis . | |
| 3,516,267 | 6/1970 | Uhlir . | |
| 3,807,243 | 4/1974 | Yada | 74/63 |
| 3,852,998 | 12/1974 | Leeson | 74/63 |
| 4,241,897 | 12/1980 | Maezawa | 74/424.8 VA |
| 4,476,735 | 10/1984 | Cantwell | 74/84 R |
| 4,477,054 | 10/1984 | Danby et al. | 751/122 |
| 4,584,904 | 4/1986 | Distin, Jr. et al. | 74/63 |
| 4,643,047 | 2/1987 | Distin et al. | 74/63 |
| 4,829,851 | 5/1989 | Imase | 74/798 |
| 4,867,009 | 9/1989 | Hudson | 74/650 |
| 4,922,781 | 5/1990 | Peiji | 74/462 |
| 4,930,746 | 6/1990 | Reinicke et al. | 251/129.11 |
| 4,960,003 | 10/1990 | Hartley | 74/63 |
| 4,973,295 | 11/1990 | Lee | 475/153 |
| 5,016,487 | 5/1991 | Bollmann | 476/36 |
| 5,024,639 * | 6/1991 | Crispo | 475/221 |
| 5,083,989 * | 1/1992 | Yates et al. | 475/248 |
| 5,238,461 * | 8/1993 | Gotman | 475/248 |
| 5,247,856 * | 9/1993 | Cuypers | 74/665 F |
| 5,312,306 | 5/1994 | Folino | 475/196 |
| 5,321,988 | 6/1994 | Folino | 74/25 |
| 5,409,431 * | 4/1995 | Vranish | 475/342 |
| 5,425,682 | 6/1995 | Hayashi | 475/5 |
| 5,443,428 | 8/1995 | April et al. | 475/163 |
| 5,461,941 | 10/1995 | Young | 74/650 |
| 5,509,863 * | 4/1996 | Mansson et al. | 475/273 |
| 5,514,045 | 5/1996 | Folino | 476/36 |
| 5,556,355 * | 9/1996 | Ostrowski | 475/332 |
| 5,562,564 | 10/1996 | Folino | 476/36 |
| 5,577,423 | 11/1996 | Mimura | 74/650 |
| 5,600,999 | 2/1997 | Folino | 74/122 |
| 5,607,370 | 3/1997 | Maslow et al. | 475/196 |
| 5,683,323 | 11/1997 | Imase | 475/168 |

FOREIGN PATENT DOCUMENTS

| | | | |
|---|---|---|---|
| 1368545 | 1/1988 | (SU) . | |
| 1569470 | 6/1990 | (SU) . | |
| 1821597 A1 | 10/1990 | (SU) . | |
| WO 92/16775 | 10/1992 | (WO) | F16H/25/06 |
| WO 94/18472 | 8/1994 | (WO) | F16H/1/34 |
| WO 94/29617 | 12/1994 | (WO) | F16H/15/08 |

* cited by examiner

IN-LINE TRANSMISSION WITH COUNTER-ROTATING OUTPUTS

PRIORITY

This application is a continuation-in-part of the following: U.S. patent application Ser. No. 08/826,475, filed Mar. 27, 1997, entitled: IN-LINE SPEED CONVERTER, and U.S. patent application Ser. No. 08/920,311, filed Aug. 30, 1997, entitled: SPEED CONVERTER WITH ASYMMETRIC AND FRACTIONAL CAMS, and of U.S. patent application Ser. No. 09/016,501, filed Jan. 30, 1998, entitled: NESTED SPEED CONVERTER, with all of the foregoing including their incorporated contents being incorporated herein by reference.

BACKGROUND OF THE INVENTION

The present invention relates to mechanical power transmissions, and more particularly, to transmissions with counter-rotating outputs, preferably located on the same central axis as the input.

Speed conversion is an important capability in the efficient utilization of rotary motive force. The occasion often arises for increasing or reducing of the speed of a drive member to a higher or lower speed at a driven member. In automobiles, for example, a hydraulic transmission, with various combinations of gear assemblies, accomplishes the task of converting the high rotary speed of the gasoline engine to the lower rotational requirements at the driven axle. Typically, such transmissions are quite complex, requiring many parts to operate in sophisticated syncopation, and are quite labor intensive for both assembly and service. Other speed conversion applications include water vessels with single and counter-rotating propellers. Typically in these applications, the speed reducer housing is mounted ("grounded") directly to the equipment housing to react the transmission forces.

At times the effect of speed conversion (e.g., speed reduction) is also referred to as torque conversion (e.g., torque amplification). It will be further appreciated that the terms speed reducer and torque increaser are thus related as are the terms speed increaser and torque reducer, for purposes of this disclosure.

It is an object of the present invention to provide a speed converter which is simplified in nature but is robust in transmission capability.

It is a further object of the present invention to provide a speed converter which is relatively easy to assemble and service.

It is an additional object of the present invention to provide a speed converter design which is adaptable to provision of counter-rotating outputs.

It is yet an additional object of the present invention to provide a rotary motion converter design which is adaptable to provision of counter-rotating outputs.

SUMMARY OF THE INVENTION

These and other objects are well met by the presently disclosed, highly efficient, speed converting power transmission assembly with counter-rotating outputs. The invention is directed to provision of clockwise and counter-clockwise rotating outputs in an "in-line" manner, i.e., having the input and output shafts on the same central axis.

In a preferred embodiment of the invention, apparatus is provided for converting a rotary input to a rotary output, having a primary cam for providing a rotary input in a first direction, and then a secondary cam to interact therewith via rolling elements. For ease of presentation, these cams, cam tracks or discrete cams are generally referred to below as cams. Either the primary or secondary cam has a plurality of cycles. These cycles at times may appear to be tooth-like and are referred to below either as cycles or as teeth without distinction.

In embodiments of the invention, the primary and secondary cams are for mounting on a common axis along with an intermediate disk either radially or axially in between them. The intermediate disk has a series of slots for receipt of interacting elements such as balls or rollers (for simplicity these are generally referred to (either as balls or rollers below). An important function of the intermediate disk is that it is a direction-dictating (i.e., "directional") element, such that it dictates reversing or non-reversing output, depending upon the inter-slot angle (slot angle for short). At least one of the three disks is an input disk, at least one is an output disk and at least one disk is a reaction disk (i.e., it reacts the drive forces being applied from the drive disk to the driven disk via the interacting elements). In the preferred embodiments of the invention, the interacting elements move radially in radial slots of the invention, although analogous axial configurations are also within the spirit of the invention. Various embodiments use either disks or cylinders with or without open centers (for simplicity all generally referred to as disks below).

The below description can be applied to various embodiments and should be understood to do so, even though one or another embodiment is shown or described for ease of description. In other words, the following description is provided by way of illustration and not limitation.

In one radial embodiment of the invention, the primary and secondary cams are each formed on a face of a respective primary and secondary disk. Each of the primary and secondary cams has various flank portions. A respective ball in a respective radial intermediate disk slot is oscillated between a maximum and maximum radius by the primary cam. In one embodiment, the slotted intermediate disk is a grounded reaction disk for reacting the drive force on the balls in the slots, and the secondary cam is a driven disk which is driven into rotation by action of the radially oscillating balls. In another embodiment, the slotted intermediate disk is driven into rotation by action of the radially oscillating balls, with the drive force on the balls being reacted by the secondary cam as the grounded reaction disk. In another embodiment, one cam is grounded and is the reaction disk, while the second cam and the intermediate disk are the rotating input and output.

In various embodiments of the invention, the slot locations and the slot angles on the intermediate disk are selected in recognition of the fact that for a rotating primary cam, e.g., clockwise, the intermediate disk must locate the balls such that the rise side of the primary cam interacts with the clockwise side of the cycles of the secondary cam (for clockwise driven rotation) or with the counterclockwise side of the cycles of the secondary cam (for counterclockwise driven rotation). Thus the configuration of the intermediate disk is changed according to whether a reversing or non-reversing output is desired.

In one embodiment, the primary cam has a driving portion and the secondary cam has a driven portion, wherein the driving portion has a contour that varies substantially linearly with angular rotation at a first rate of variation. The driven portion varies substantially linearly with angular rotation at a second rate of variation. These cams are designed according to the cams developed in U.S. Pat. No. 5,312,306, incorporated herein by reference. Other waveforms, including those based on linear spiral segments and on sinusoidal curves, and others, can be used in practice of the present invention.

The relationship of the cams determines the speed conversion ratio of the apparatus. In accordance with the foregoing, the speed ratio of the apparatus can be determined by comparing the number of cycles of the output cam to the number of cycles of the input cam. Alternatively it can be a comparison of the number of slots to cycles, depending upon which component is input or output and which is reacting.

The primary and secondary cams are referred to as a conjugate pair, in that the centerline of a respective slot is defined as the straight-line loci of the interacting contact among the conjugate cams and the associated rolling element (e.g., ball).

In one embodiment of the invention, the first cam device is formed as a face cam on the primary cam disk, and in simplest form has one cycle starting at a base circle radius and proceeding about the center of the disk at a constantly increasing radius and at a constant angular rotation to a maximum radius at 180°, i.e., in the rise mode, and then proceeding in the fall mode at a decreasing radius of the same rate and constant angular rotation back to the original base circle radius, completing 360°. This symmetry achieves uniform speed output when the first cam is paired with a similarly symmetric second cam. A multiple-cycle cam may also be based on this design with a fractional period, i.e., 360°/(# of cycles).

In another embodiment of the invention, where the driven output rotates in the same direction as the drive input, and assuming a plurality of cycles in the secondary cam, the angle y separating the ball slots should be greater than the angle 0 subtended by each of the secondary cam cycles, as measured at a base circle formed at the minimum radius of the secondary cam, to avoid having two balls on one cycle. In a limited situation, equality of $\gamma$ and $\theta$ is possible, but there can be a dead spot is such a case; thus, for purposes of this application, the case of equality is considered to be an imperfect practice of the preferred condition. The minimum angle y is preferably computed as the difference between the number of cycles in the secondary cam less the number of cycles in the primary cam divided into 360°; integer multiples of the value thus computed may generally also be used.

In a reversing speed converter embodiment of the invention, the intermediate member has a plurality of radial slots separated from each other by a slot angle of $\beta$, where $\beta<\theta<\gamma$. The primary cam has a rise side and a fall side and each secondary cam cycle has a rise side and a fall side, such that the slot angle locates the slots with the rise side of the primary cam interacting with the fall side of the secondary cam cycles, with the cams and intermediate member interacting to provide a rotary output in a direction opposite to the rotating input.

In one preferred application of the invention having a primary, an intermediate and a secondary element (disk or cylinder), a first of the elements is coupled to a drive input shaft, the latter of which extends to mount a first propeller for rotating in a first direction; a second of the elements, counter-rotating to the first element, mounts a second counter-rotating propeller. In one embodiment, the counter-rotating element is a slotted intermediate element having a non-reversing slot configuration and interacts with a grounded secondary disk. Alternatively, the counter-rotating element is a secondary element in a configuration using a grounded reversing-type intermediate element. This configuration may be provided with speed reduction or may deliver counter-rotation without speed change.

In yet another alternative, where a boat has a motor which presents a motor shaft with a propeller below the waterline, and in practice of the invention, the boat propeller is removed, a primary element, an intermediate element and a secondary element are mounted over the motor shaft and a counter-rotating propeller is mounted on the secondary element. The boat propeller (or a substitute) is reinstalled on the boat motor shaft. The intermediate element is grounded to the hull. Now the motor turns the first propeller in a first direction and the new propeller counter-rotates.

The present speed converter configurations are volumetrically efficient in a cost effective packaging. Furthermore, consider the load sharing aspects of the balls. Speed reducers using gears transmit torque essentially one gear tooth at a time. Consequently, the customary accommodation for gears to have high torque loads is to increase tooth proportions so that contact stresses are within allowable limits for wear and fatigue life. Likewise, epicyclic drives use eccentric motion devices where perhaps two teeth may be sharing the load. In such cases, in order to avoid higher than acceptable contact stresses larger components are required. Meanwhile the speed converter of this invention utilizes a plurality of balls to transmit the load interacted at contract angles which are optimized so as to distribute the forces essentially equally around 360° of the cams and to significantly reduce highly localized forces and unbalanced loads as is present in gear reducers.

In yet a further embodiment of the invention, apparatus is provided for converting a rotary input to a converted output, having an input part and an output part. The input part preferably has a first device for providing a rotary input in a first direction. The output part preferably has a second and third device. These devices are located about a common axis and one of them has a slotted arrangement for receipt of at least one interacting element. The slotted device defines at least one slot extending at least between a minimum and maximum displacement. Each slot is for receipt of an interacting element which is put in motion by rotation of one of the devices. The in-motion interacting element travels between the maximum and minimum displacements (radial in a flat plate or disk embodiment and axial in a fully cylindrical embodiment). One of the devices is put in motion by the in-motion interacting element, the in-motion interacting element being loaded between the driving and driven cams. The in-motion interacting element makes a transition in the direction of its motion at the maximum and minimum displacements, at which time the interacting element is relatively unloaded at each of these transitions.

In these embodiments, it is preferred that two of the devices form a conjugate pair, wherein the centerline of a slot is defined as the straight-line locus of the contact points on the ball by the conjugate pair at that slot during input rotation. Other embodiments appear in the following description.

In another aspect of the invention, rotary motion is translated from a first speed at the input, such as from a motor, to a second speed at the load, at counter-rotating outputs, using a nested set of components: including a pair of wavy devices, a slotted device between the pair, and an oscillatable translating arrangement, i.e., preferably using ball or roller type interacting elements loaded in the slots. In a preferred embodiment of the invention, two of the devices are rotatable about a common axis with the third device fixed about that axis. In an alternative embodiment, the third device is also rotatable about the same axis. Counter-rotating output shafts are presented in-line with the input shaft.

In other embodiments of the invention, planetary, bevel and spur gear configurations are taught that also offer this in-line transmission configuration. However, it will be appreciated that variations of ones of these embodiments can have input and output shafts that are on parallel axes but not in-line, while still featuring the direct-drive shaft pass-through capability of the invention.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF A PREFERRED EMBODIMENT

Use of a single propeller provides adequate propulsion in many cases. However, replacement of that single propeller with counter-rotating propellers can increase performance, controllability and fuel efficiency. This is so because the dual propellers can be designed by a person skilled in the art to balance torque side thrusts, thus eliminating the unbalanced torque side thrust that must be reacted from a single propeller and that causes canting and drag in the single-propeller-driven system.

Figure 1:
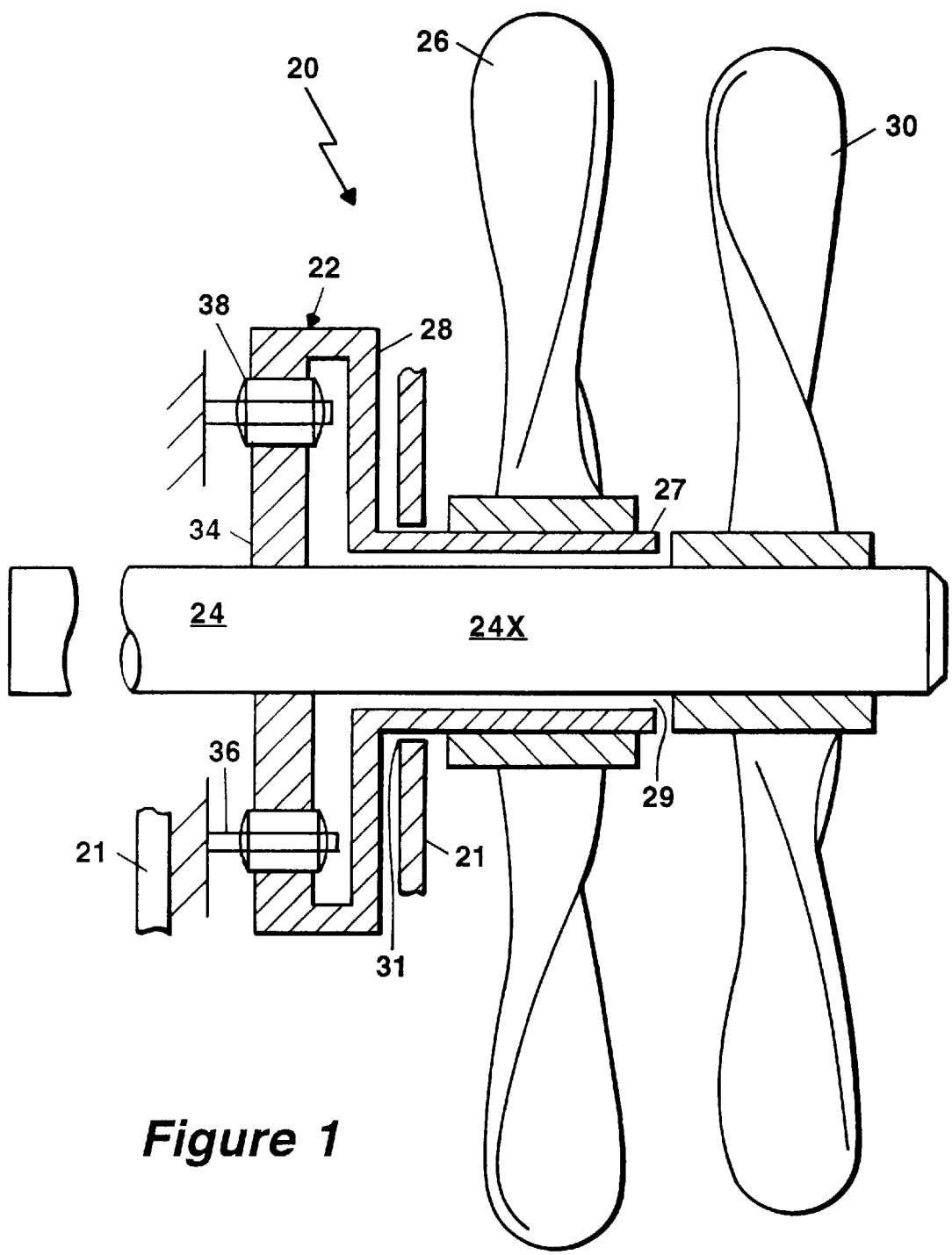
FIG. 1 is a sectional side view on the centerline of a preferred embodiment of the present invention.

A preferred single-stage counter-rotating output apparatus 20 of the present invention is shown in FIG. 1 mounted to the hull 21 of a vessel. Speed converter 22 receives rotary input at its drive shaft 24 from a motor M. The speed converter 22 is direction-reversing, with a first propeller 26 mounted on output shaft sleeve 27 connected to the converter's reverse-rotating output 28. Thus converter input 24 rotates in a first direction and the converter output 28 rotates propeller 26 in a reversed direction. A second propeller 30 is directly mounted on an extension 24X of the drive shaft 24, thus being rotated at the input speed in the inputs direction, counter to the direction of the first propeller 26. In this manner a simple counter-rotating transmission is presented with only a few major components. Propeller 26 rotates in the opposite direction, based on the reversing function of reverser converter 22. This direction-reversing converter 22 may include speed increase, speed decrease or no speed change.

With reference again to FIG. 1, it will be noted that output shaft sleeve 27 is cylindrical and defines an inner annual opening 29. Input shaft 24 passes through converter 22 out to shaft extension 24X. This shaft extension reaches through an opening 31 in hull 21, and through annular opening 29 of sleeve 27. Propeller 30 mounted on extension 24X rotates in the direction of rotation of the drive shaft at the drive shaft input speed. In this manner, counter-rotating propellers are provided in a simple in-line mechanism.

The present invention can be used to retrofit existing vehicles by removing the old single propeller, cutting the single drive shaft, inserting an apparatus 20 of FIG. 1, and then installing two propellers 26, 30 on the two outputs 27, 24X. As will be appreciated by a person skilled in the art, this conversion from single to properly selected dual propellers provides an immediate increase in performance, controllability and fuel efficiency as a result of the balancing of torques.

Alternatively a retrofit kit can be supplied in which apparatus 20 is mounted outboard of the vessel, to the outboard end of the existing drive shaft, or to the drive shaft of an outboard motor, with the input shaft 24 connected to the outboard end of the pre-existing drive shaft. The apparatus 20 is mounted or "grounded" to the outer hull or to the casing of an outboard motor, and then the two propellers are installed on the apparatus. This conversion from single to dual propellers also provides an immediate increase in performance, controllability and fuel efficiency.

Also in a retrofit kit of the above invention, where the mounting hole 31 in the hull 21 has a diameter of "x", the shaft sleeve 27 is sized to fit appropriately, i.e., having a diameter less than "x" and preferably equal to the diameter of the original single propeller shaft. The inner shaft now is fit within this sleeve 27. Consequently, assuming the mounting hole 31 has not been enlarged, then the inner shaft extension 24e must have a reduced diameter to fit within sleeve 27. This reduction in diameter reduces the torque rating of the shaft extension 24e, relative to the diameter of the original single propeller shaft. However, the present invention advantageously accommodates this reduction because the same torque that previously was handled by the original single shaft when it was serving a single propeller is now shared by each of the two propellers. Thus the smaller diameter shaft 24e is appropriate since it need only serve about half of the original drive torque of the original single output shaft.

Figure 2:
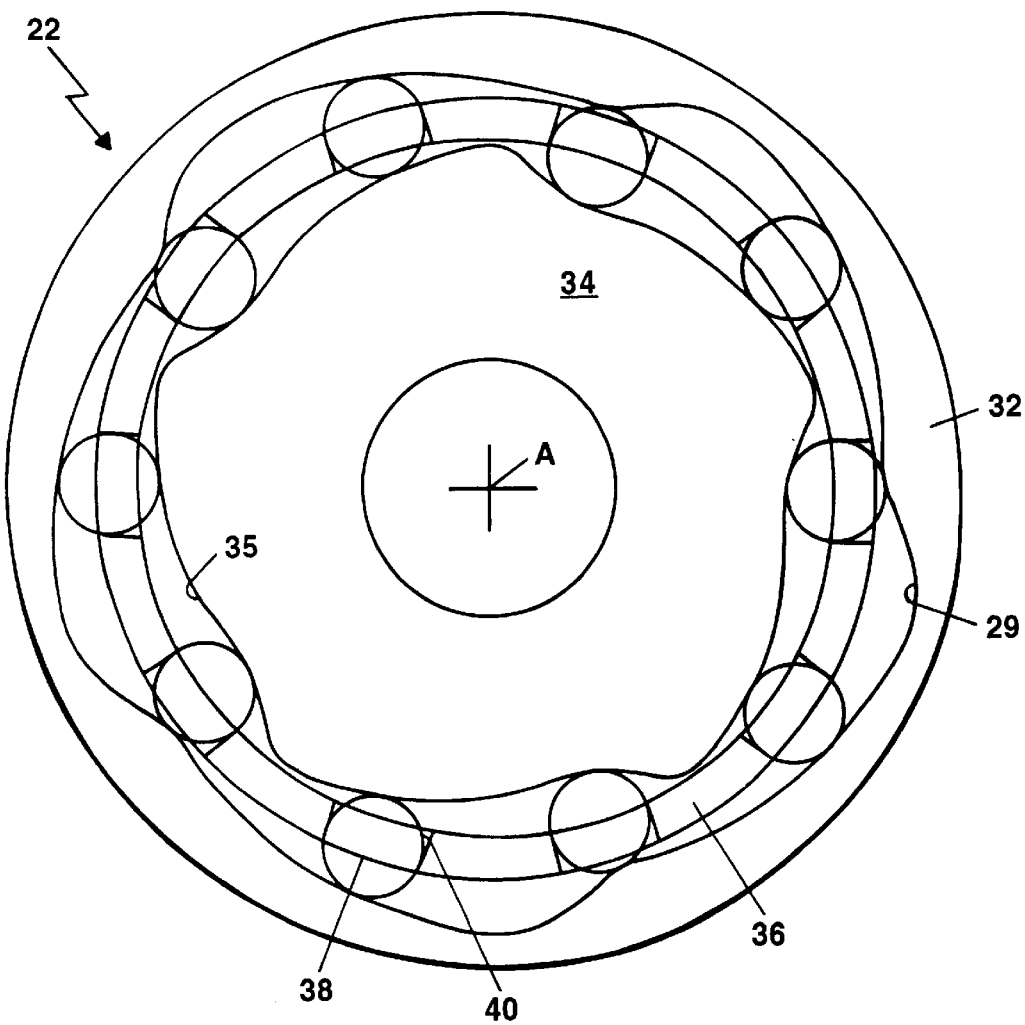
FIG. 2 is a preferred embodiment of the invention of FIG. 1.
Figure 3:
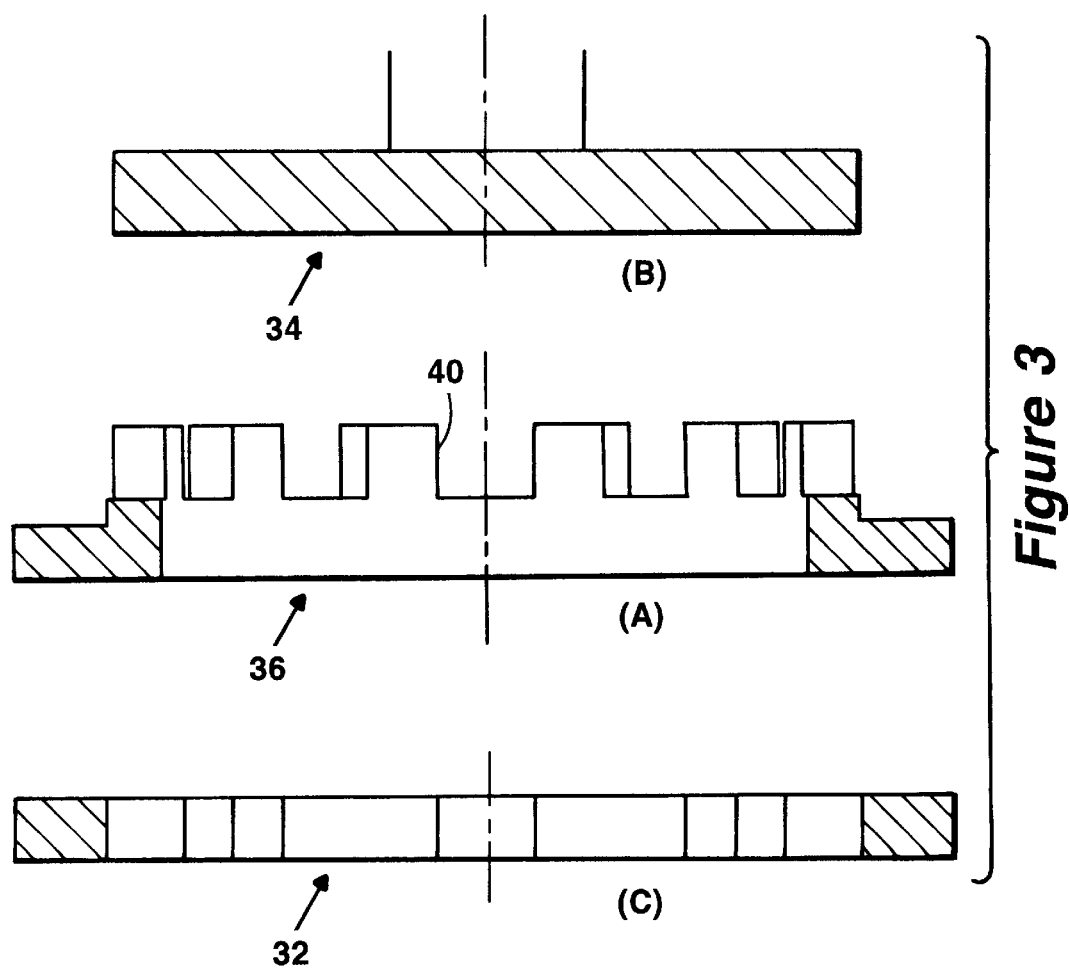
FIGS. 3(A–C) shows the three disk components of the invention of FIG. 2.

In an additional embodiment of the invention, a preferred nested speed converter 22 of the invention, shown in FIG. 2, advantageously provides in-line 1:1 torque/speed conversion. In this embodiment, outer disk 32, as part of output 28, has a multi-cycle cam 29 formed on its interior side, facing radially inward. Inner disk 34 has a multi-cycle cam 35 formed on its outer side, facing radially outward. An intermediate slotted disk 36 is interposed between these disks and their facing cams. Interacting elements, such as rollers 38, are loaded in slots 40 of slotted disk 36. Disks 32, 34, 36, are concentrically mounted about the center A and are shown in detail in FIG. 3.

Disk 34 is mounted on drive shaft 24 and provides input rotation to converter 22. As drive shaft 24 rotates, drive cam 35 of the rotating input disk 34 drives the rollers 38 radially in slots 40 and against cam 29 of driven output disk 32. Slotted disk 36 is grounded and therefore reacts the drive forces on the driven rollers. The rollers travel radially in and out within slots 40. In the embodiment of FIG. 2, a five tooth drive cam 35 interacts with a five tooth driven cam 29. The speed ratio is 1:1. Thus the speed in is equal to the speed out at both propellers. These counter-rotating propellers, properly pitched and sized in a conventional manner, can share a balanced torque load.

Figure 4:
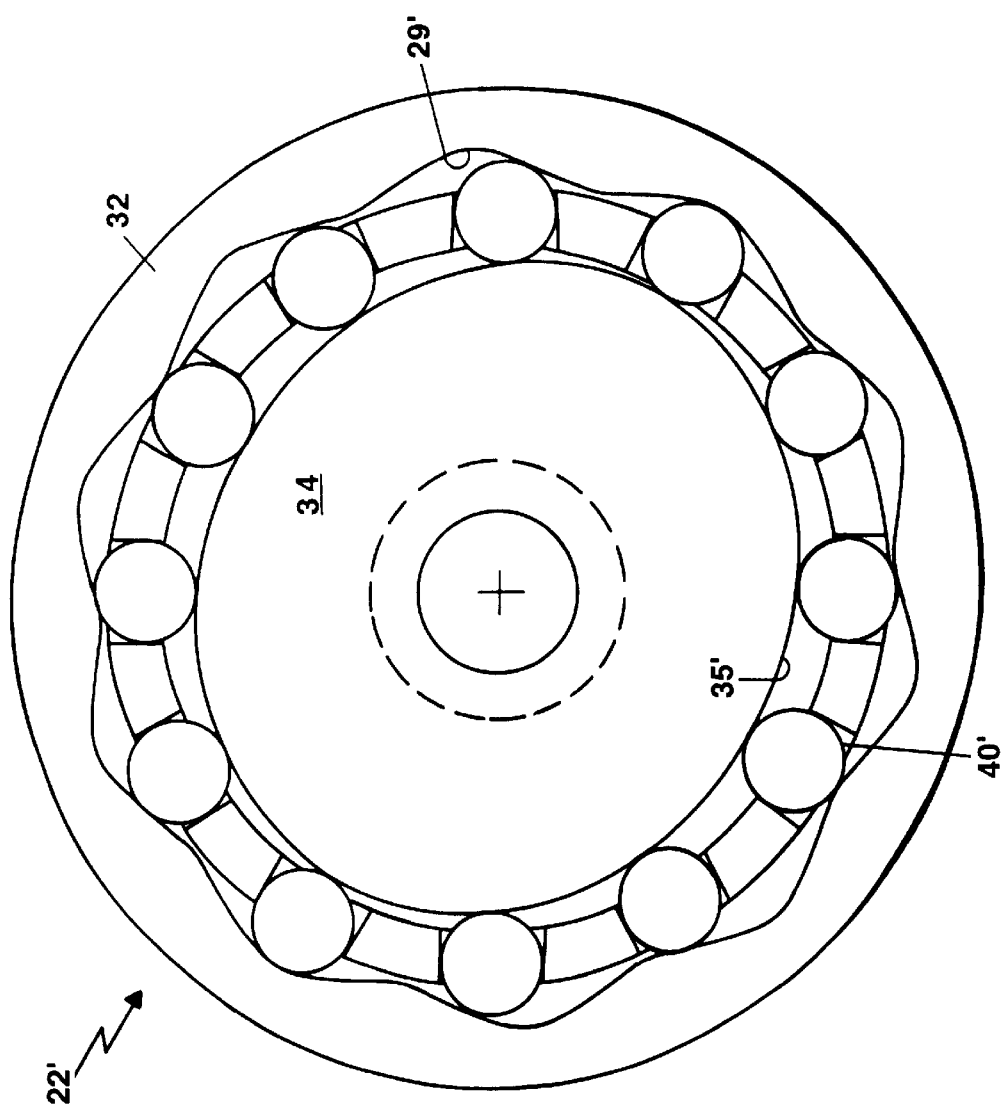
FIG. 4 is an alternative embodiment of the invention of FIG. 1.

FIG. 4 shows speed converter 22', which is analogous to 22 but has a different cam profile. In this case there is no possibility of 1:1 interaction, only either speed reduction or speed increase. However, the speed ratio is still based on the relationship of the number of output teeth on the driven cam 29'0 to input teeth on the drive cam 35'. The cam profiles in converter 22' are conjugate such that the intersection of the curves defines the straight line path of each of the slots 40'.

In the above, if the driven cam had more teeth than the drive cam, then the speed converter 22' would perform a speed reduction function, or with fewer teeth it would act as a speed increaser. Again, the propellers can be provided in a conventional manner with appropriate pitch to balance such differences in output speeds.

Figure 5:
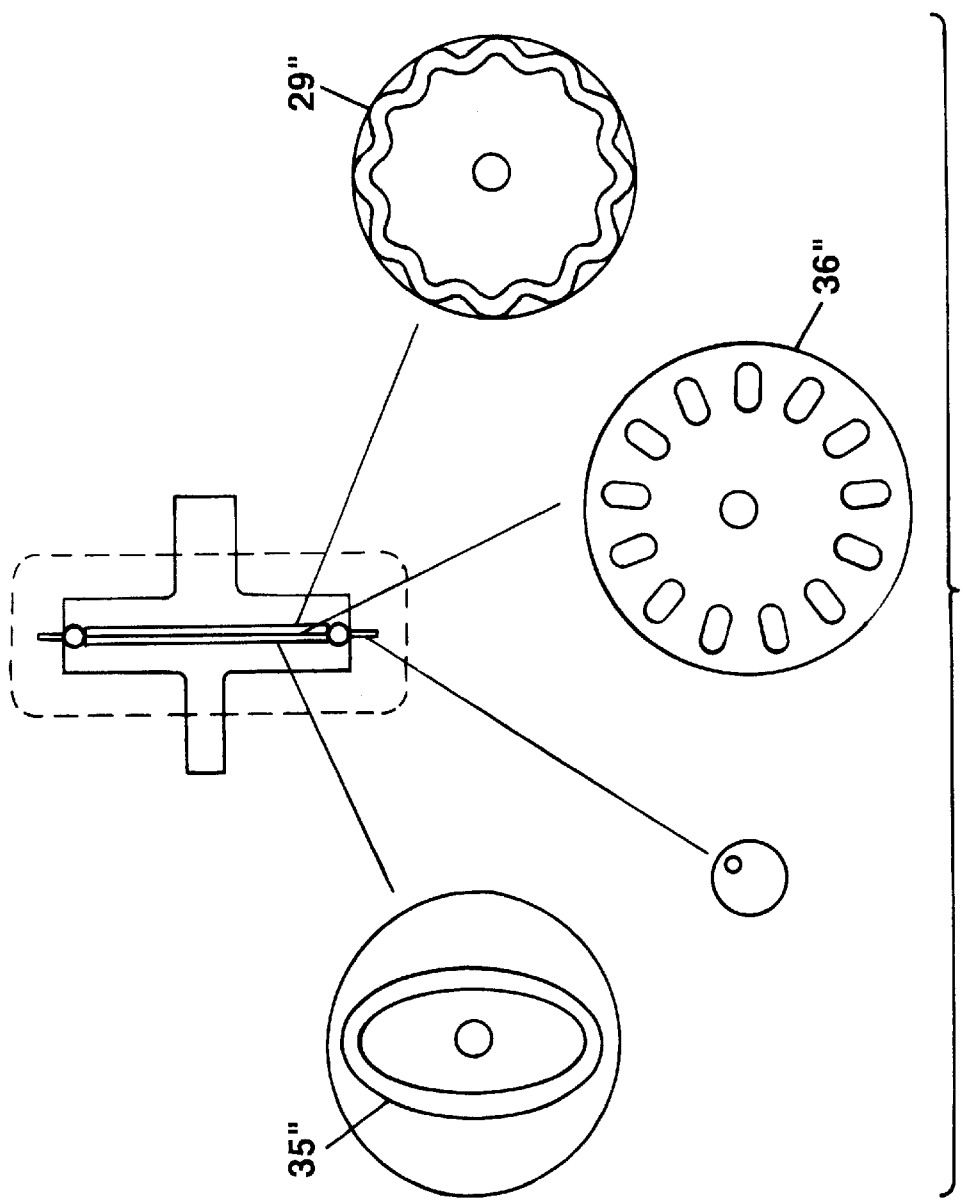
FIG. 5 is an alternative embodiment of the invention of FIG. 1.

One of the features of an embodiment of the invention is the pass-through of the drive shaft straight to one of the propellers, while speed converter 22 (or 22') just hangs off of the drive shaft in the manner disclosed. FIG. 5 is an alternative embodiment using a cam track design similar to that disclosed in U.S. Pat. No. 5,316,306., incorporated herein by reference, having a drive cam 35" and a driven cam 29" and an axially intermediate radially slotted disk 36". However, the embodiments of FIGS. 1–3 suffer less axial separating forces and therefore are preferred for continuous high torque applications.

Figure 6:
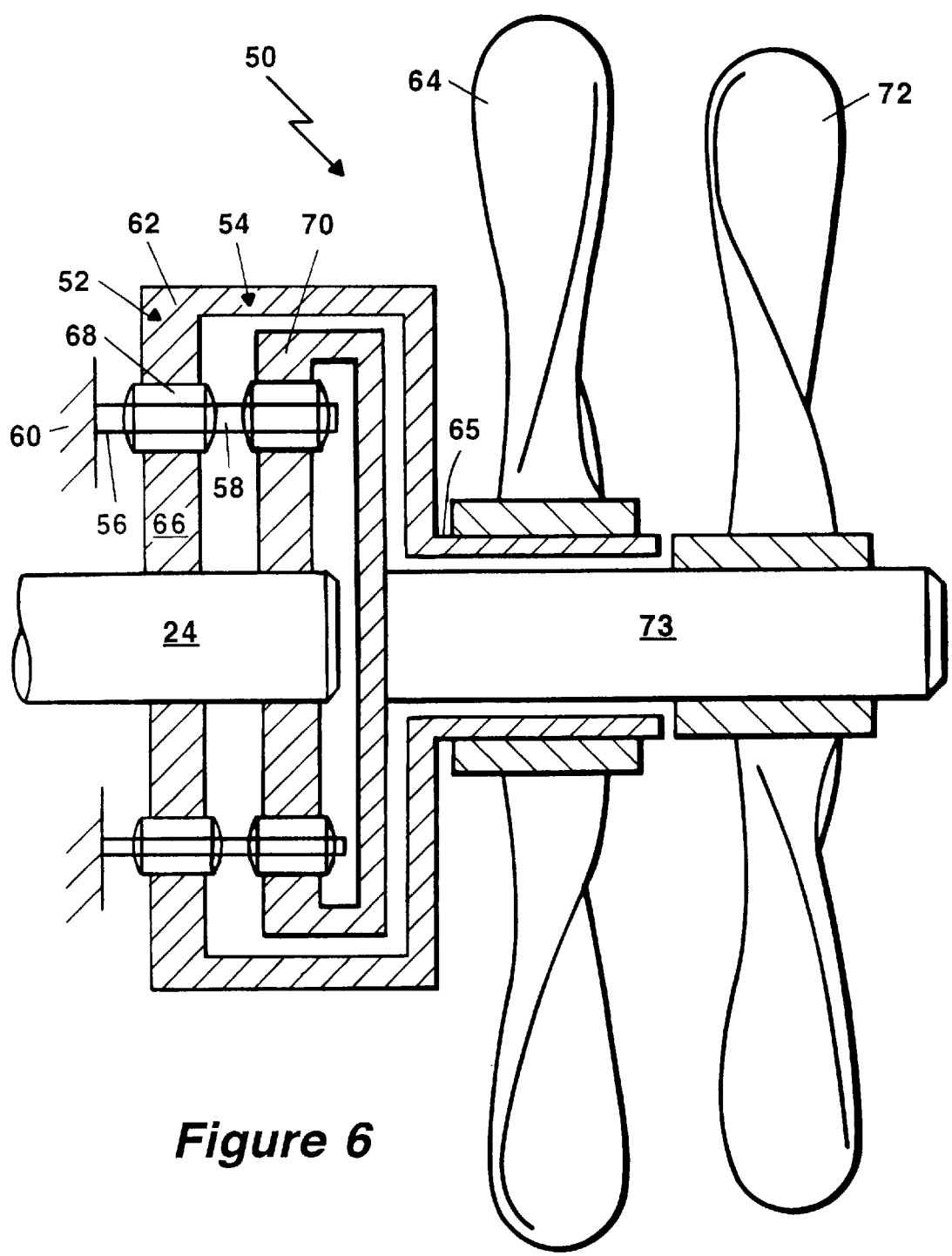
FIG. 6 is an sectional side view on the centerline of a preferred embodiment of the present invention.

Additional embodiments of the invention include speed conversion (such as speed reduction) going to both propellers. In FIG. 6, speed converter 50 includes two speed converters 52, 54, whose slotted disks 56, 58, are joined together and grounded to the boat hull at 60, for an inboard motor, or to the casing 60 of an outboard motor. The outer cam disk 62 of converter 52 drives the first propeller 64 via hollow shaft 65, as the inner cam disk 66 drives rollers 68 which in turn are driving the outer cam disk 62 in motion in a first direction. Outer cam disk 70 of converter 54 drives the second propeller 72 via shaft 73 into rotation in a second direction. In this case, one of converters 52, 54 has a reversed output and one does not, relative to the direction of the rotating input. This is dictated by the number of rollers related to the number of cam teeth. The number of teeth on the two cams is summed to obtain the number of rollers on a reverser, while the difference of the teeth forms a non-reverser. Therefore, it is preferred to use a reverser configuration in every case so as to maximize the number of load-carrying elements, wherein the direction-dictating slotting of the intermediate is selected accordingly.

Furthermore, it will be further appreciated that if the outer disk is driven into rotation, then the slotted disk will tend to drive in the opposite direction (if not grounded). Selecting which one is grounded and using the other as the output then allows a reverser configuration to be used for both reversing and non-reversing outputs (thus maximizing the number of rolling elements in each case). Thus a non-reversing output is achieved using a reverser design if the slotted disk is the output and the outer disk is grounded.

Figure 7:
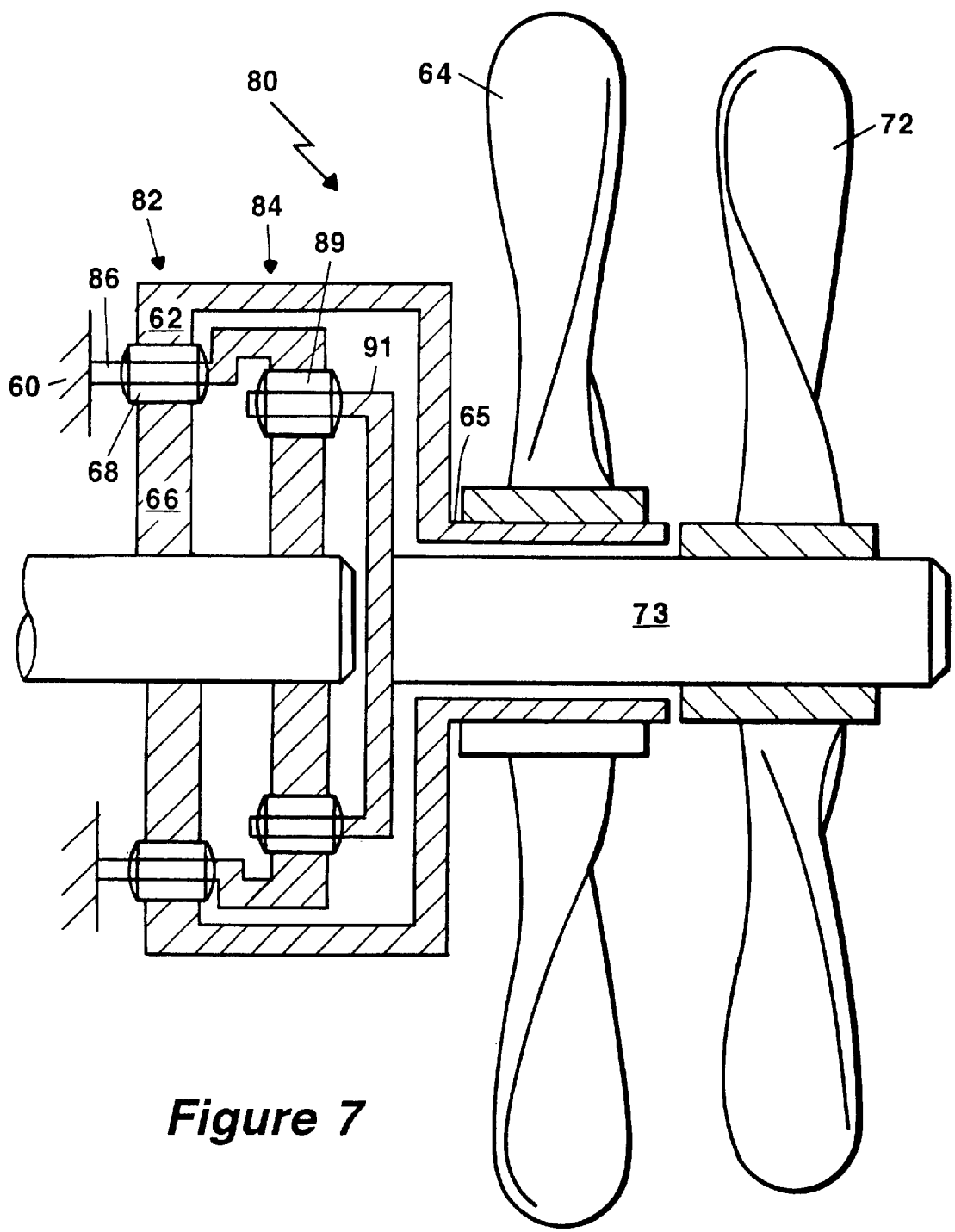
FIG. 7 is a sectional side view on the centerline of a preferred embodiment of the present invention.

In FIG. 7, two reverser-type converters are used, but one has a non-reversing output. Specifically, speed converter 80 includes two reverser-type speed converters 82, 84. The first slotted disk 86 is joined to the second outer cam disk 89 and the assembly is grounded to the boat hull at 60. The outer cam disk 62 of converter 82 drives the first propeller 64 via hollow shaft 65. The inner cam disk 66 drives rollers 68, which drive outer cam disk 62 in motion in a first direction. Slotted disk 91 of converter 84 drives the second propeller 72 via shaft 73 into rotation in a second direction. Because both of the converters 52, 54 have a reverser configuration, a maximum of load-carrying rollers can be used. In this case, the first propeller 64 driven by the outer disk 62 has a reversed rotation, i.e., reversed from the drive shaft direction, while the direction of the second propeller 72 is not reversed because that output is taken from the non-reversing slotted disk.

However, the speed ratio of a slotted disk output arrangement is computed slightly differently, in that the number of slots must be substituted for the number of cycles on the output in computing the speed ratio; e.g., a two-cycle first cam (input) interacting with a ten-cycle second cam (ground) through a slotted disk housing 12 rollers (output) gives a speed reduction ratio of 12:2=6:1.

Each converter can be independently designed to have a speed reduction or increase as desired. It will therefore be appreciated that the speeds of the output shafts need not be the same, since each is a function of the numbers of teeth in each speed converter. This gives the benefit of a degree of freedom to the propeller designer who would have differently pitched or sized propellers. Thus the input torque will split between each according to the capacities of each of the stages and the propellers. These low-parts-count and highly adaptable counter-rotating transmissions can be used in aviation and marine applications for improved performance.

Figure 8A:
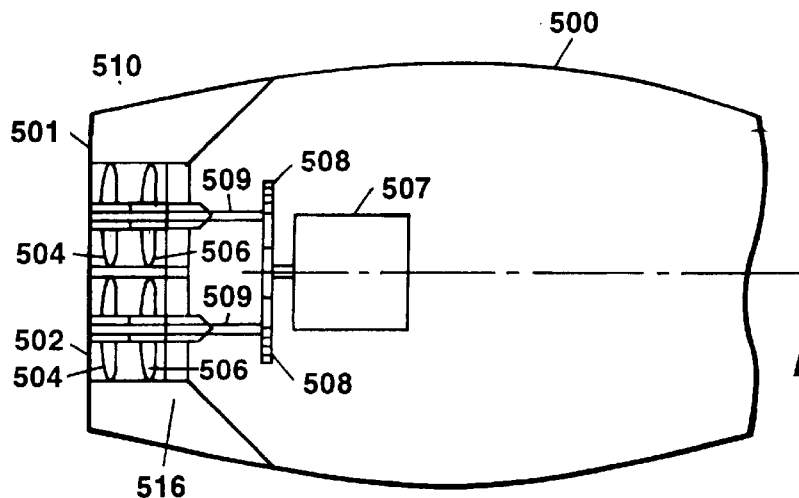
FIG. 8A shows pairs of counter-rotating propellers mounted in the hull of a watercraft.
Figure 8B:
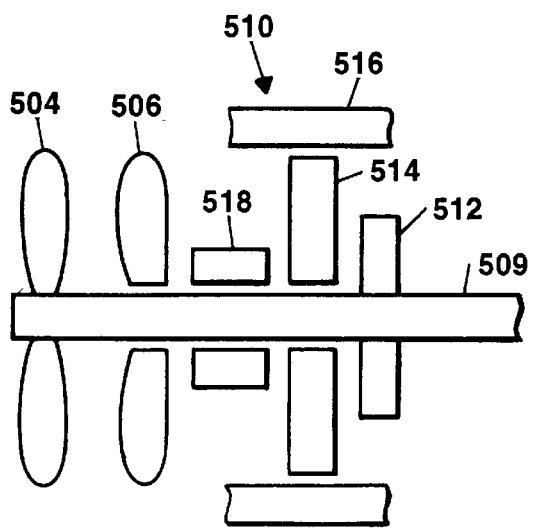
FIGS. 8B and 8C show two alternative embodiments of the present invention for providing counter-rotation to each pair of propellers.

A watercraft 500 is shown in FIG. 8(A) having two twin propeller sets 501, 502. In one embodiment, these propeller sets are components of respective waterjet pumps. Each set has counter-rotating propellers 504, 506 driven by motor 507 via splitter staging 508 and drive shaft 509. In the embodiment of FIG. 8(B), the first propeller 504 is mounted on drive shaft 509 and is direct driven, while the second propeller 506 is counter-driven by a reversing speed reducer assembly 510 of the invention. In assembly 510, the primary disk 512 is mounted on the drive shaft 509, a reversing slotted intermediate disk 514 (with balls in the slots not shown) is mounted to the hull 516 and the second propeller 506 is mounted on the secondary disk 518. Accordingly, rotation of the drive shaft 509 rotates propeller 504 directly and rotates propeller 506 via assembly 510 and in the opposite direction. As a result of the foregoing, the water-flow is less turbulent and provides more thrust delivered into moving the vehicle in the water, with reduced sideways torque thrust, compared to a single propeller device. Clearly, the foregoing invention can be used to give dual propeller capability to any single propeller application, inboard or outboard, marine or aviation.

Figure 8C:
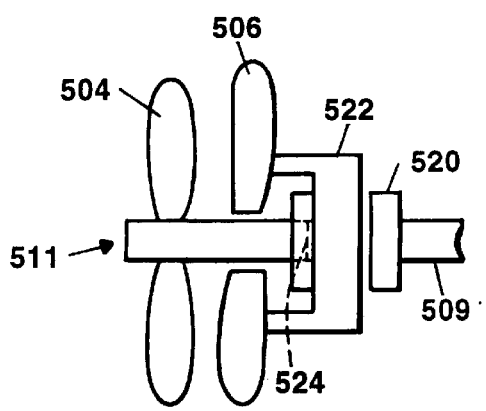

In yet another embodiment of the invention, the counter-rotating drive assembly 511 shown in FIG. 8(C) has primary disk 520 mounted on the input shaft 509, with the second propeller 506 mounted on the intermediate disk 522 and the first propeller 504 mounted on the secondary disk 524. This is a differential arrangement, wherein an imbalance of load on the propellers will cause the less loaded or slower propeller to drive harder or faster until the drive assembly achieves torque balance.

It will now be appreciated that in one embodiment of the present invention provision is made for driving counter-rotating concentric shafts using an input part that drives a first output part and a second output part. These parts are mounted concentrically on a common central axis. One of the outputs is directly connected to the input passing through the center of the other output. The input part rotates in a first direction and the first output follows. The input part drives the second output part in a second direction counter to the first direction, with or without speed change. The input part preferably has a first device and the second output part has a second device and a third device. These two latter devices cooperate with the first device to rotate the second output in the second direction. Yet in another embodiment, speed conversion is provided to counter-rotating outputs. In a preferred set of embodiments, method and apparatus provide for a rotary-motion-converting power transmission assembly with counter-rotating outputs, one version having rotating concentric nested cams interacting via rolling elements that travel radially in slots of an intermediate disk to convert input cam rotation to two counter-rotating outputs.

Alternative counter-rotation transmissions are also within the broad scope of the invention. The speed converter 22 of the invention can be a planetary, epicyclic, harmonic, bevel, spur or other transmission mechanism, as long as it can pass the input to propeller 30 without intervention, while also providing direction-reversing drive to propeller 26. Preferably speed converter 22 is in-line, radially balanced, and compact.

Figure 9A:
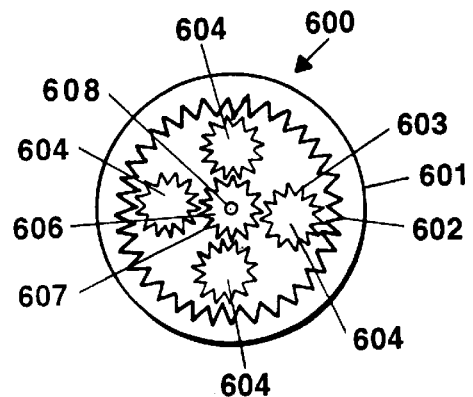
FIGS 9(A–C) show a planetary embodiment of the invention of FIG. 1.
Figure 9B:
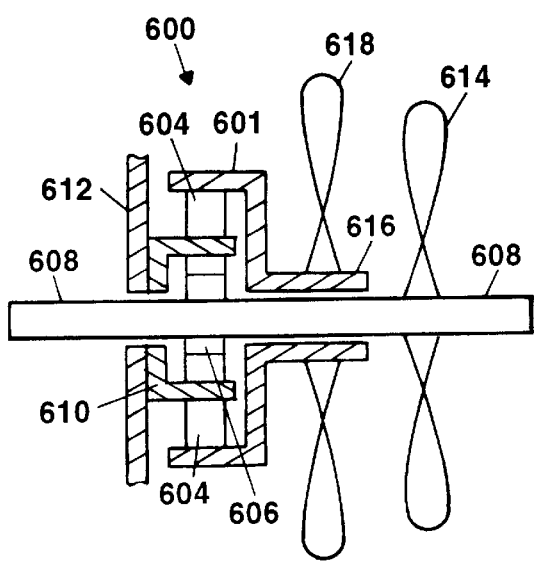
Figure 9C:
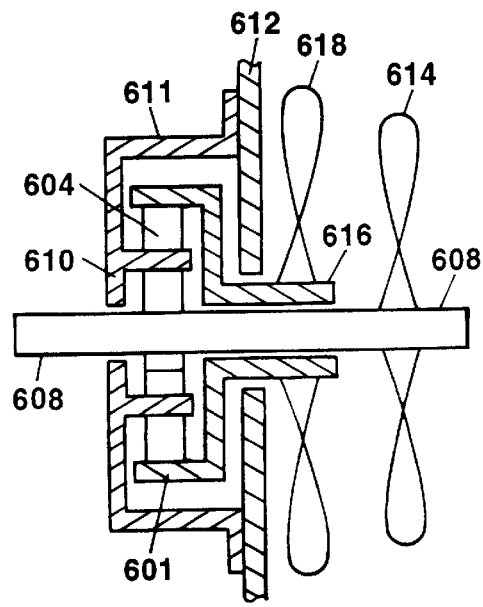

In FIGS. 9(A–C), a planetary embodiment 600 of the present in-line counter-rotating invention is shown having a ring gear 601 with teeth 602 meshing with teeth 603 of planets 604. A sun gear 606 has teeth 607 that mesh with the planet: teeth 603. The sun 606 is mounted on input shaft 608. The planets are stationary and are mounted via carrier 610 fixed to the stern bulkhead 612. When input shaft 608 is rotated in a first direction, the sun gear rotates the planets, which rotate the ring gear in a direction opposite to the first direction. Shaft 608 runs through the planet carrier and the sun gear and extends out the stern to present a rotating shaft for a first propeller 614. The ring gear 601 connects to an open-centered shaft 616, on which is mounted propeller 618. The first propeller 614 rotates at the input speed and the second propeller 618 rotates at the speed reduction of the planetary set. The pitch and size of the propellers will be adjusted accordingly as will be understood by a person skilled in such art. In one embodiment, as shown in FIG. 9(B), the gearbox is outside the stern bulkhead 612, while in an alternative embodiment, as shown in FIG. 9(C), the gearbox is inside the stern bulkhead 612, and the planet carrier 610 is connected to bulkhead 612 through flanges 611.

Figure 10:
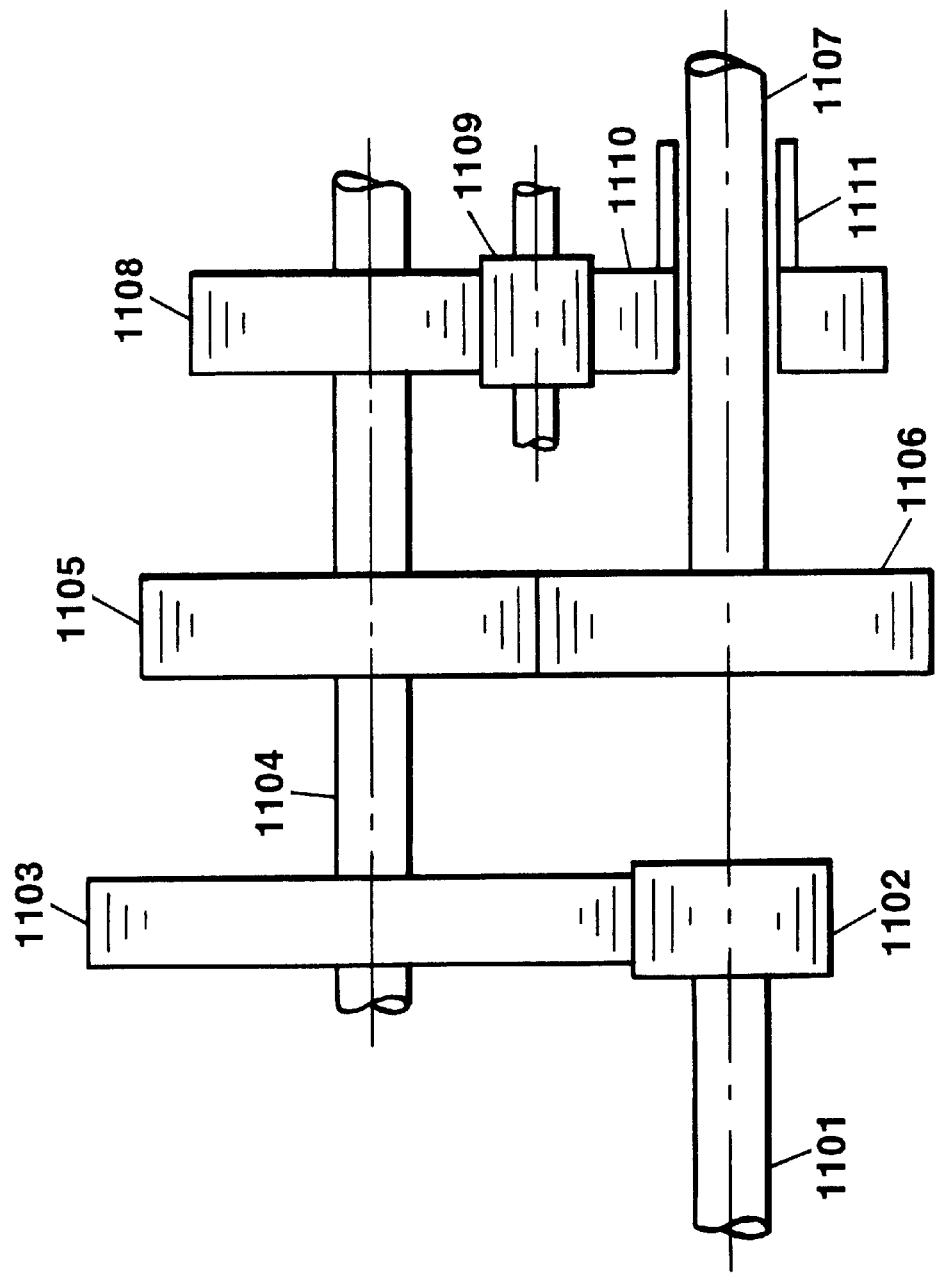
FIG. 10 shows a spur gear embodiment of the invention of FIG. 6.

An embodiment of the invention utilizing spur gears and having counter-rotating concentric outputs is shown schematically in FIG. 10. Input shaft 1101 rotates gear 1102, which is in mesh with another gear 1103. A desired speed change is effected through this mesh. Gear 1103, in turn, is coupled to a second shaft 1104 that is parallel to 1101. Also mounted on shaft 1104 are gears 1105 and 1108. Gear 1105 is in mesh with gear 1106, to which is attached shaft 1107 as one of the counter-rotating outputs. Shaft 1107 is in line with input shaft 1101. Meanwhile, gear 1108 is in mesh with an idler gear 1109 that is spindled on ground. Gear 1109 turns gear 1110, to which is attached shaft 1111 as the second of the counter-rotating outputs. Output shaft 1111 is in line with input shaft 1101 on their common central axis. The number of teeth on the various gears determines the ultimate speed change between the input and each of the outputs; as a special case, it is possible to have shaft 1107 and shaft 1111 rotate in opposite directions at equal speeds.

Figure 11:
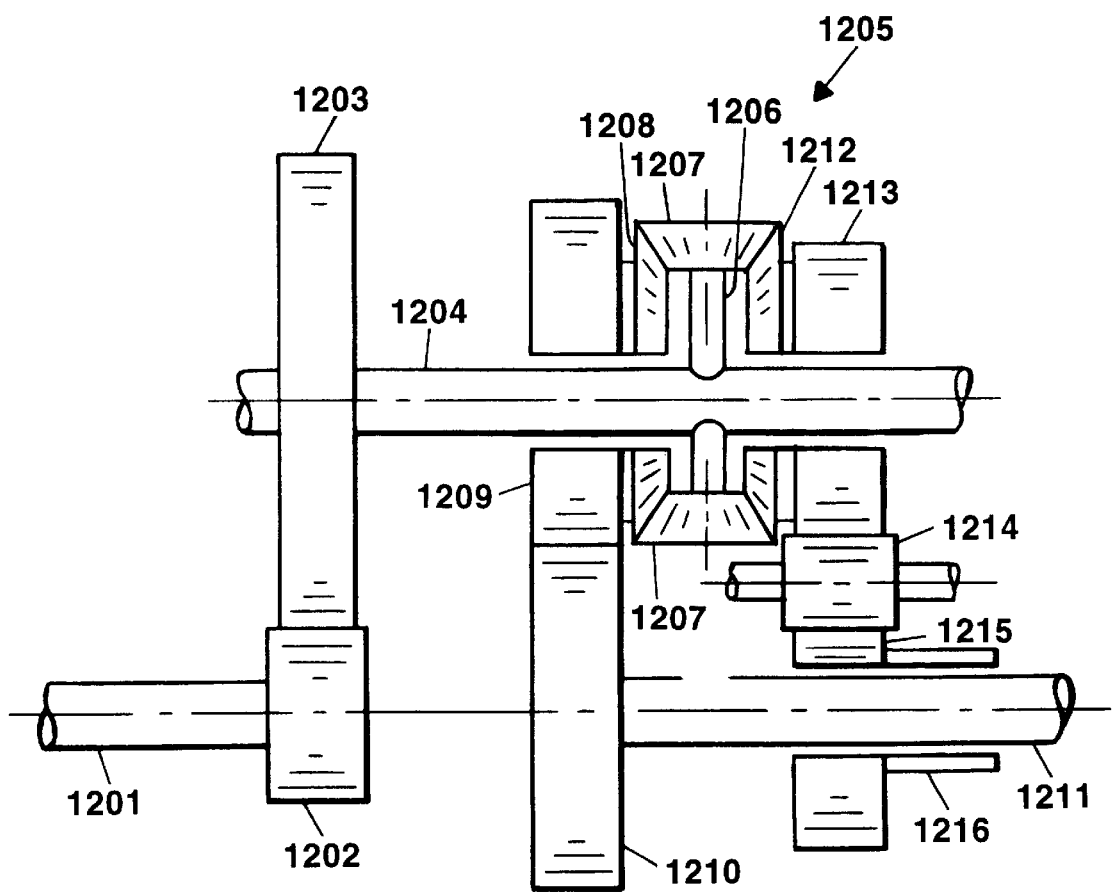
FIG. 11 shows a differential gear embodiment of the invention of FIG. 6.

An alternative embodiment of the invention utilizes spur gears, is shown schematically in FIG. 11. It has a counter-rotating pair of concentric outputs in-line with the input shaft. Specifically, input shaft 1201 rotates gear 1202, which is in mesh with another gear 1203. A desired speed change is effected through this mesh. Gear 1203, in turn, is coupled to a second shaft 1204 that is parallel to 1201. Rigidly coupled to 1204 is the spider 1206 of a differential gearbox 1205. A multiplicity of pinions 1207 are spindled on spider 1206 and are in mesh with two opposing bevel gears 1208 and 1212. As shaft 1204 rotates, it drives spider 1206 and causes pinions 1207 to precess around shaft 1204. In typical differential fashion, pinions 1207 then drive the two bevel gears 1208 and 1212 into rotation such that they have equal torques and an average speed equal to that of spider 1206. (The differential arrangement will permit the speeds of gears 1208 and 1212 to be different from each other, accommodating this difference through rotation of pinions 1207 about their own axes.) Bevel gear 1208 is rigidly coupled to a spur gear 1209, which is in mesh with gear 1210. One of the two counter-rotating outputs is taken from gear 1210 through shaft 1211. Meanwhile, bevel gear 1212 is rigidly coupled to spur gear 1213, which drives an idler gear 1214 spindled on ground (i.e., mounted to the housing which in turn is mounted on the bulkhead). Gear 1214 then drives gear 1215 and, ultimately, shaft 1216, which is the second of the counter-rotating outputs. Both outputs are in line with the input. The numbers of teeth on the various gears determine the ultimate speed ratio between the input and each of the outputs. Unlike the previous embodiment, however, this embodiment permits the two outputs to operate at the same torque rather than the same speed, due to the presence of the differential.

Figure 12:
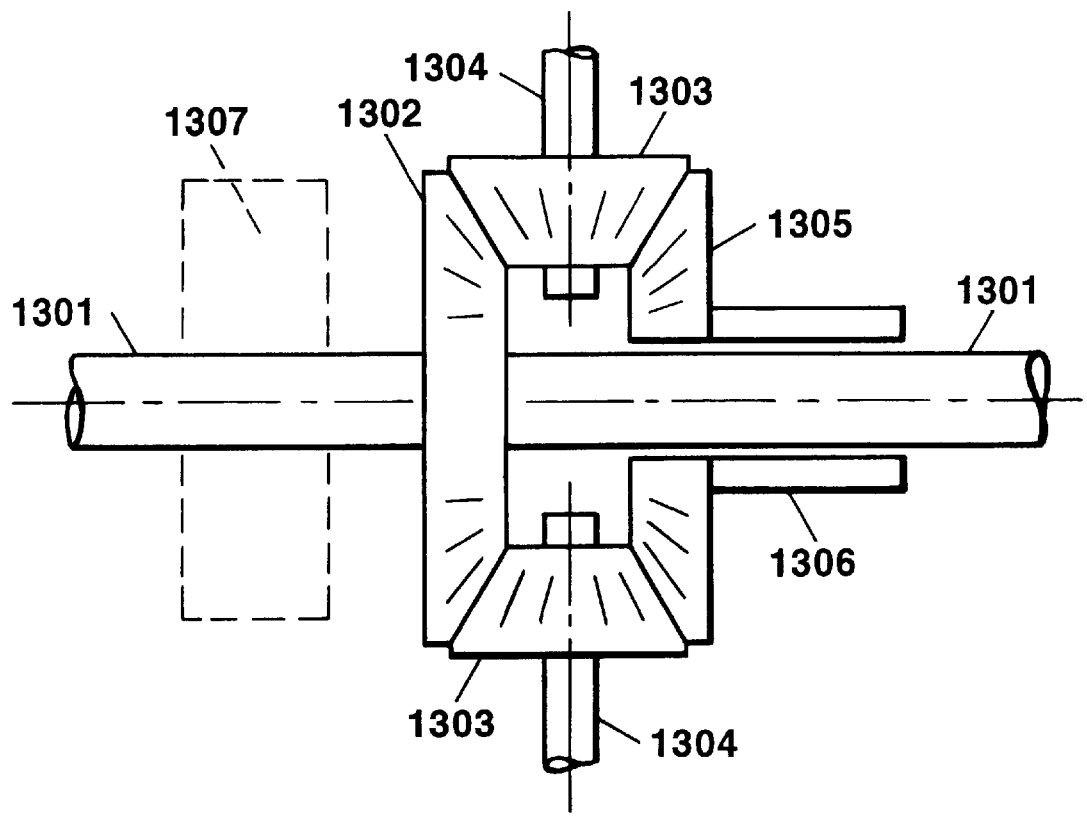
FIG. 12 shows a bevel gear embodiment of the invention of FIG. 1.

Another embodiment of the invention is shown schematically in FIG. 12 having a counter-rotating pair of concentric outputs in-line with the input. In this embodiment, input shaft 1301 is coupled to a bevel gear 1302 and continues through the drive assembly to form one of the two counter-rotating outputs as a direct drive. In mesh with bevel gear 1302 are a multiplicity of pinions 1303. Pinions 1303 are mounted on shafts 1304 spindled on ground (e.g. to the housing mounted on the bulkhead), and mesh with a second bevel gear 1305 positioned opposite gear 1302. Accordingly, bevel gear 1305 is driven into rotation by the pinions 1303 so that its speed is equal to that of gear 1302, but in the opposite direction. Shaft 1306 coupled to gear 1305 forms the second of the counter-rotating outputs. Thus a pair of outputs that are in-line and rotate at the same speed in opposite directions is obtained in a simple package. The drive as described does not perform a speed change between the input and either of the outputs; however, if desired, a speed change mechanism 1307 may be inserted before the counter-rotation mechanism.

In the presently disclosed embodiments, the input is in-line with the outputs, providing simplicity in transmission installation. Various of these embodiments offer a high degree of design freedom, such that a person skilled in the relevant art will benefit from the degree of freedom afforded by the counter-rotation mechanisms of the present invention.

Various other modifications of the specific embodiments set forth above are also within the spirit and scope of the invention. Furthermore, use of relative terms such as first and second or primary and secondary, and intermediate, as well as clockwise and counterclockwise, is by way of example and not by way of limitation. Thus the above examples and embodiments are provided by way of illustration and not by way of limitation of the scope of the present invention. It will be further appreciated that apparatus made in accordance with the teachings of the present invention has a multiplicity of speed and torque conversion applications, including: marine and aviation, as well as industrial applications. The scope of the present invention is as set forth in the following claims.

What is claimed is:

1. Apparatus for converting a rotary input to counter-rotating outputs, the apparatus comprising:

said apparatus defining a source of rotary input mounted on an axis, an input part, a first output part, and a second output part, said parts mounted on said axis, with said input driven by said source for driving said outputs, one said output part defining an open center extending along said axis, one said output extending along said open center, said input part providing a rotary input rate in a first direction, said input part rotating in said first direction, said input part driving said first output part to provide a first output relative to said input rate in said first direction, said input part driving said second output part in a second direction counter to the first, and said input and output parts defining a conjugate pair of cam devices and a slotted device, wherein all three of said devices are located concentrically about said axis, said devices cooperating to rotate said second output in said second direction.

2. Apparatus of claim 1 wherein said first output rotates at said input rate.

3. Apparatus of claim 2 wherein said devices are located concentrically about said common axis and said input and outputs are in-line.

4. Apparatus of claim 1 wherein slotted device has radial slots for radial travel of interacting elements.

5. Apparatus of claim 4 wherein said slotted device defines a plurality of slots extending at least between a minimum and maximum radial displacement, ones of said slots being for receipt of a respective interacting element, ones of said interacting elements being put in motion by rotation of one of said devices, said in-motion interacting elements traveling between said maximum and minimum displacements, said output part being put in motion by said in-motion interacting elements, and wherein each said in-motion interacting element makes a transition in the direction of said motion at said maximum and at said minimum displacements.

6. Apparatus of claim 4 wherein one of said cam devices comprises a plurality of cycles, each cycle subtending a cycle angle, ones of said slots separated from each other by a slot angle different from said cycle angle.

7. Apparatus of claim 4 wherein a first one of said cam devices rotates in said first direction and comprises a cycle having a rise side and a fall side, and wherein a second of said cam devices comprises a cycle with a rise side and a fall side, and wherein the slot angle locates the slots in said slotted device such that the rise side of said first one interacts via one said in-motion interacting element with the fall side of said second one.

8. Apparatus of claim 7 wherein said cam devices and slotted device interact to provide said output in a second direction, said input rotating in a first direction, said output rotating in another direction, and said input driving a second output at said input rate in one said direction.

9. Apparatus of claim 1 further wherein said source is a motor and said output part has a first speed converter with a first output and a second speed converter with a second output, one of said outputs rotating in said first direction and the other output rotating counter to the first direction to provide concentric counter-rotating outputs.

10. Apparatus of claim 9 wherein at least one of said speed converters has a slotted device and a conjugate pair of cam devices, all nested concentrically about said axis, said slotted device defining a plurality of slots extending at least between a minimum and maximum radial displacement, ones of said slots being for receipt of a respective interacting element, ones of said interacting elements being put in motion by rotation of one of said devices and traveling between said maximum and minimum displacements, one of said outputs being put in rotary motion by said in-motion interacting elements, and wherein each said interacting element makes a transition in the direction of said motion at said maximum and at said minimum displacements, one of said cam devices comprising a plurality of cycles, each cycle subtending a cycle angle, ones of said slots separated from each other by a slot angle different from said cycle angle, wherein a first one of said cam devices rotates in said first direction and comprises a cycle having a rise side and a fall side, and wherein a second of said cam devices comprises a cycle with a rise side and a fall side, and wherein the slot angle locates the slots such that the rise side of said first one interacts via one said in-motion interacting element with the fall side of said second one, said cam devices and slotted device interacting to provide said output in a second direction.

11. Apparatus of claim 10 wherein said first output rotates at said input rate.

12. Apparatus of claim 10 wherein said devices are located concentrically about a common axis, two of said devices comprising a conjugate pair of cam devices and the third of said devices comprising a slotted device, wherein one of said cam devices comprises a plurality of cycles, each cycle subtending a cycle angle, ones of said slots separated from each other by a slot angle different from said cycle angle.

13. Apparatus of claim 9 wherein one of said speed converters comprises a multiplicity of gears, ones of said gears interacting at respective gear meshes.

14. Apparatus of claim 12 wherein a first one of said cam devices rotates in said first direction and comprises a cycle having a rise side and a fall side, and wherein a second of said cam devices comprises a cycle with a rise side and a fall side, and wherein the slot angle locates the slots such that the rise side of said first one interacts via one said in-motion interacting element with the fall side of said second one.

15. Apparatus of claim 9 wherein said speed converters are mounted coaxially, with the output of one said converter passing through the middle of the other converter.

16. Apparatus of claim 15 further comprising a housing for mounting said apparatus fixed relative to a rotary input and wherein one of said speed converters has a slotted disk fixed to said housing, said slotted disk concentrically mounted with said cam devices and nested between the working surfaces of said cam devices, said working surfaces of said cams facing each other.

17. Apparatus of claim 15 further comprising a housing for mounting said apparatus fixed relative to a rotary input and wherein one of said speed converters has an outer cam device fixed to said housing, said slotted disk concentrically mounted with said cam devices and nested between the working surfaces of said cam devices, said working surfaces of said cams facing each other.

18. Apparatus of claim 15 further comprising a housing for mounting said apparatus fixed relative to a rotary input and wherein one of said speed converters has a slotted disk, said slotted disk being furnished with radial slots and providing one of said outputs and being radially nested between the working surfaces of said cam devices, said working surfaces of said cam devices facing each other.

19. Apparatus of claim 15 further comprising a housing for mounting said apparatus fixed relative to a rotary input and wherein one of said speed converters has an outer cam device providing one of said outputs, further comprising a slotted disk with radial slots, said slotted disk radially nested between the working surfaces of said cam devices, said working surfaces of said cams facing each other.

20. Method for driving counter-rotating concentric shafts, the steps comprising:

defining a motor output shaft axis, providing an input part, a first output part, and a second output part, mounting said parts on said axis, in line with said motor shaft, with said input driven by said motor shaft and driving said outputs, providing one said output passing through the center of said other output, said input part rotating in a first direction and said input part driving said second output part in a second direction counter to said first direction, and providing said input part with a first device and further providing said second output part with a second device and a third device, said second and third devices cooperating with said first device to rotate said second output in said second direction.

* * * * *